July 3, 1923.
R. M. SEARLE
READING APPLIANCE
Filed June 30, 1921
1,460,923
2 Sheets-Sheet 1
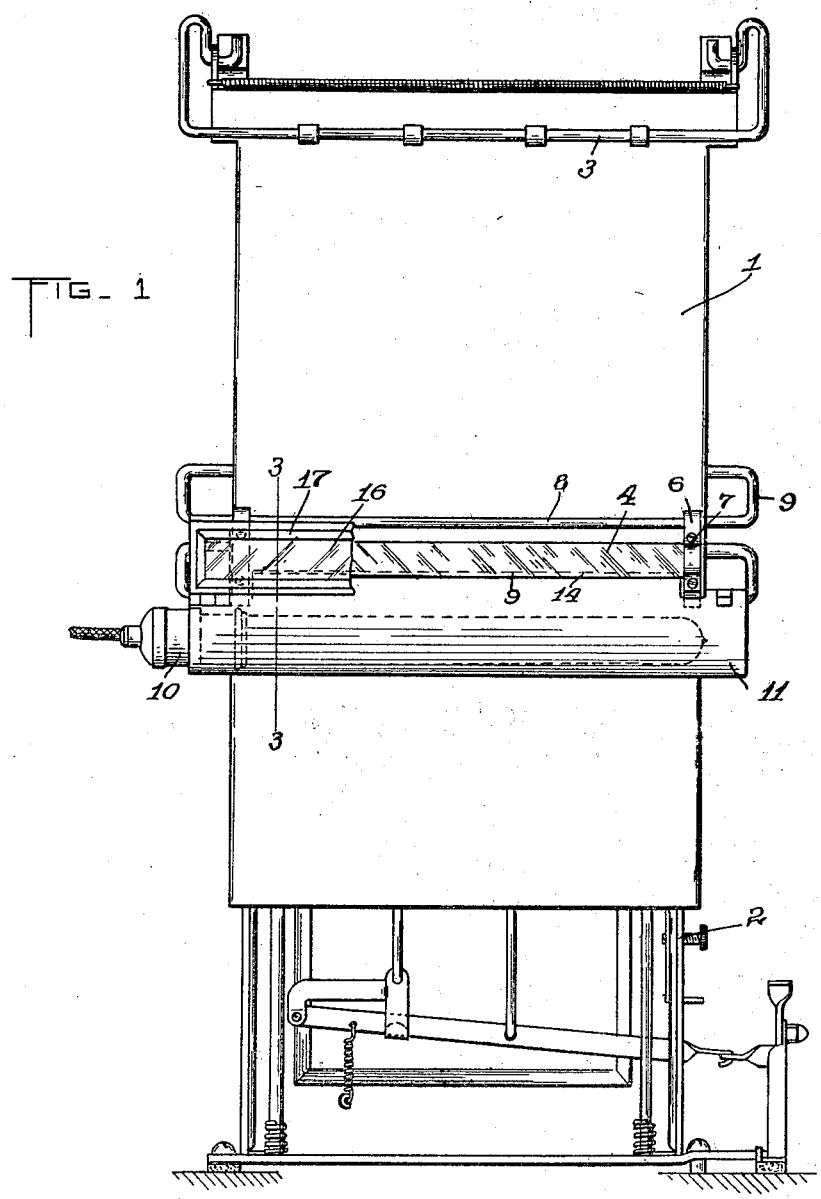
INVENTOR:
Robert M. Searle
BY
ATTORNEYS.

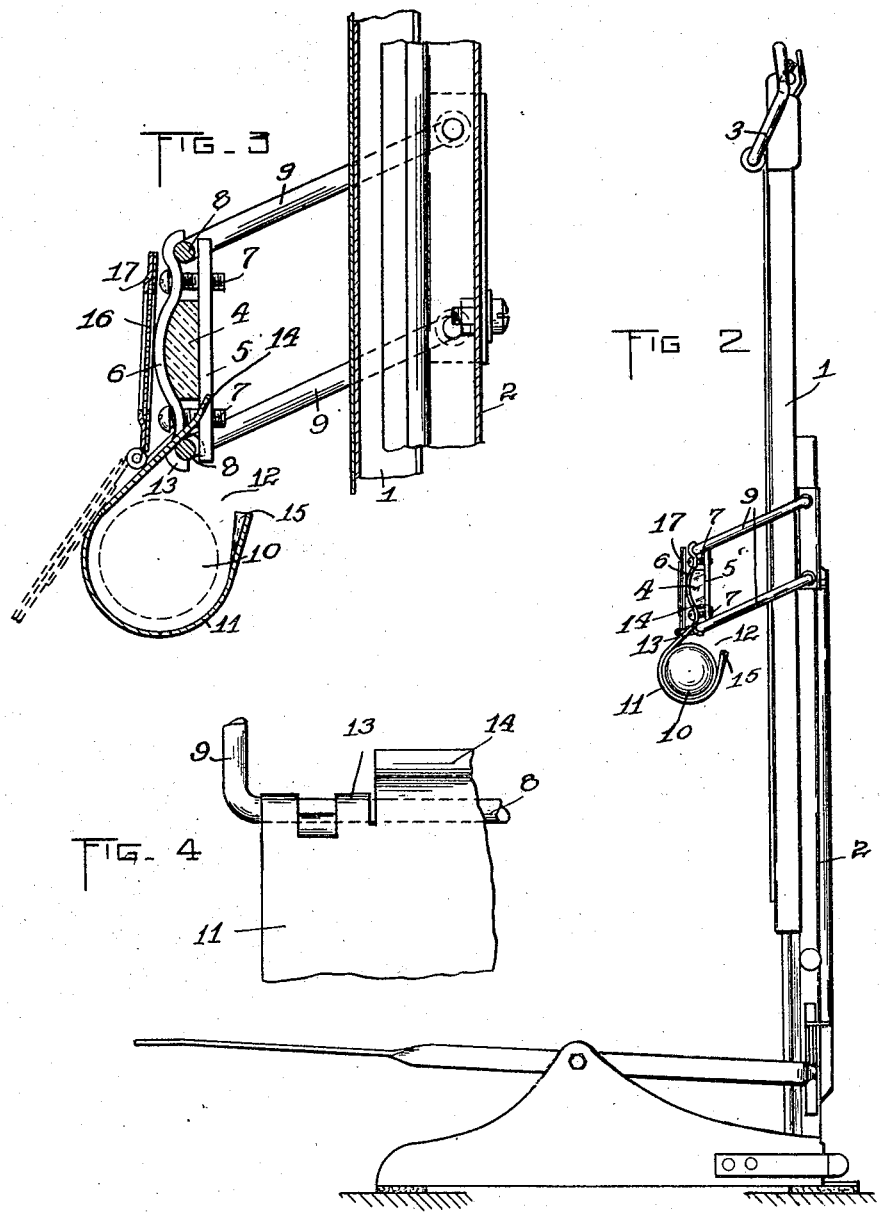

Patented July 3, 1923.

1,460,923

UNITED STATES PATENT OFFICE.

ROBERT M. SEARLE, OF ROCHESTER, NEW YORK.

READING APPLIANCE.

Application filed June 30, 1921. Serial No. 481,633.

*To all whom it may concern:*

Be it known that I, ROBERT M. SEARLE, a citizen of the United States, and resident of Rochester, in the county of Monroe and State of New York, have invented certain new and useful Improvements in Reading Appliances, of which the following is a specification.

The present invention relates to reading appliances and an object thereof is to provide an appliance by which a field may be illuminated in such a manner that a clear vision thereof may be obtained without any direct rays from the illuminating means passing to the eyes of the viewer. Another object of the invention is to provide in connection with an illuminating means a lens which will magnify the field, the illuminating means being directed upon the field in rear of the lens so that refracted rays directly from the illuminating means will not strike the eyes of the viewer. Still another object of the invention is to associate with an illuminating means a light filter which will prevent undesirable rays from the field being received by the eyes of the viewer.

To these and other ends, the invention consists of certain parts and combinations of parts, all of which will be hereinafter described, the novel features being pointed out in the appended claims.

In the drawings:

Fig. 1 is a face view of a reading appliance constructed in accordance with this invention, parts of the light filter lens being broken away to illustrate the magnifying lens;

Fig. 2 shows the reading appliance in a side elevation;

Fig. 3 is an enlarged section on the line 3—3, Fig. 1;

Fig. 4 is a detail view showing the manner in which the lamp casing is supported; and Fig. 5 is a detail view on one edge of the lamp casing showing the manner in which the latter is held from engagement with the field to be viewed.

The field to be viewed may be of any suitable form. In this instance, it is in the form of a work holder 1 which is supported for vertical movement on a stationary frame 2 in a manner well-known in copy holders, the work holder having a work clamp 3 of known construction at its upper edge for clamping the work.

A view of the field may be obtained through an elongated magnifying lens 4 which is supported transversely of the work holder on the frame 2 so that the work holder may move relatively thereto. In this instance, this lens 4 is held between two clamps each of which embodies two members 5 and 6 held together by screws 7, the clamps also engaging with two rods 8 arranged in parallel relation on opposite sides of the lens 4 and each having rearwardly and inwardly turned portions 9 at opposite ends journalled in the frame 2. This arrangement permits the lens to move toward and from the field to be viewed or work holder 1 so as to obtain the proper magnification of the work.

Arranged to illuminate the field under the lens is an illuminating means. This illuminating means, in this instance, is in the form of an elongated incandescent electrical lamp 10, extending transversely of the work support 1 and having associated therewith means, such as a lamp casing 11 of elongated form, extending transversely of the work support and enclosing the lamp in such a manner as to prevent direct rays of the lamp striking the eyes of one viewing the field through the lens. The casing has an elongated longitudinally extending opening 12 which permits the rays to issue from the lamp on the field in rear of the lamp. In this instance, the casing is formed from a single piece of sheet material rolled into substantially tubular form with its edges separated to provide the opening 12, one edge having tongues 13 rolled around the rod 8, the material being extended beyond said rolled portions to provide an edge 14 in rear of the lens acting as a line guide. The opposite edge of the sheet metal, forming the casing, is fluted at 15, and this fluted portion serves to cooperate with the work in the event that the casing is brought into engagement with the work to provide air spaces through which ventilation between the work and the casing may take place to prevent the burning of the work by the lamp casing.

There may also be associated with the illuminated field a ray filter which, in this instance, is in the form of an elongated lens 16 inclosed within a frame 17 movable with reference to the illuminating means to permit a better vision of the field independently of said ray filter. In this instance, this ray filter is what is known as day-light glass as it modifies the artificial light to produce the day-light effect on the field when the field is viewed through the lens. The illustrated manner of mounting the filter embodies a hinged connection 18 with the lamp casing permitting the lens to be swung to and from operative position.

From the foregoing it will be seen that there has been provided a reading appliance in which means is associated with the lamp of an illuminating means to prevent the direct rays from the lamp striking the eyes of one viewing the field through the lens, said means having provision to prevent the rays from issuing from the lamp on the field in rear of the lens. The lens may be in the form of a magnifying lens or a ray filtering lens or both. The lamp casing is so arranged with reference to the magnifying lens that it is adjustable with the latter so that their relationship is maintained for any adjustment. The ray filtering lens is removable from its operable position so that a view of the field may be obtained independently of such ray filter.

What I claim as my invention and desire to secure by Letters Patent is:

1. In combination with a field to be viewed, an elongated lens, a lamp, an elongated tubular casing for the lamp having one side extending to the lens so that no space is provided between the lens and the casing through which direct rays may pass to the eyes of the viewer of the field through the lens, said casing having an elongated opening permitting the rays to pass from the lamp on the field and in rear of the lens.

2. In combination with a field to be viewed, an elongated lens for viewing said field, means permitting the adjustment of the lens toward and from the field to vary the magnification, a lamp, a housing enclosing the lamp so that direct rays from the lamp may not pass to the eyes of the viewer of the field through the lens, said housing opening to permit rays to pass from the lamp on the field and in rear of the lens, and said housing being adjustable with the lens in order to maintain the relationship between them for any adjustment of the lens.

3. In combination with a field to be viewed, an elongated lens for viewing said field, means permitting the adjustment of the lens toward and from the field to vary the magnification, a lamp, a housing enclosing the lamp so that direct rays from the lamp may not pass to the eyes of the viewer of the field through the lens, said housing having an opening to permit rays to pass from the lamp on the field and in rear of the lens, and said housing being adjustable with the lens in order to maintain the relationship between them for any adjustment of the lens, and a light filter associated with said lens and removable from its operable position.

4. In combination with a field to be viewed, an elongated lens through which the field may be viewed, an elongated lamp, an elongated casing enclosing the lamp extending parallel with the lens and provided with a longitudinally extending opening, the wall of the casing on one side of the opening connecting with the lens so that rays cannot pass between them to the eyes of the viewer of the field through the lens, the opening being so situated that the rays will issue on the field and in rear of the lens.

5. In combination with a suitable field to be viewed, an elongated lens associated with said field, an elongated lamp, and an elongated tubular lamp housing enclosing said lamp so that direct rays cannot issue from the lamp between the latter and the lens to the eyes of a viewer of the field through the lens, said housing having an elongated opening for permitting light rays to pass between the field and the lens and in rear of the lens and an elongated light filter movably mounted in front of the lens.

ROBERT M. SEARLE.